UNITED STATES PATENT OFFICE.

NATHAN SULZBERGER, OF NEW YORK, N. Y.

BEEF AND VEGETABLE EXTRACT.

994,885.

Specification of Letters Patent. Patented June 13, 1911.

No Drawing. Application filed September 17, 1910. Serial No. 582,433.

*To all whom it may concern:*

Be it known that I, NATHAN SULZBERGER, a citizen of the United States of America, born in New York city, residing at Hotel Netherland, Fifty-ninth street and Fifth avenue, New York city, in the county of New York and State of New York, have invented new and useful Improvements in the Preparation of Beef and Vegetable Extracts, of which the following is a specification.

The object of this invention is to prepare a product to be used as a substitute for beef extract and for its various uses, which product, however, can be used also by the orthodox Jewish population, being prepared strictly according to its strict rituals.

The product is made from plants and vegetables and contains principally the albumin of the same, rendered more or less soluble in water by having been suitably treated, peptonized. Such rendering soluble in water and peptonization may be accomplished by treating the plants and vegetables, or the albumin, or albuminous parts of the same with pepsin, papayotin, bromelin or other ferments having similar action, or peptonizing the same by the use of certain chemicals, as for instance—hydrochloric acid. After the above treatment the resultant product, which is practically completely soluble in water, may be flavored and spiced to suit the individual taste. The same may also contain or be flavored with a product derived from animal origin—this latter, however, must be only made and prepared from milk or product derived from milk, or such animals which have been slaughtered according to the strict ritual of the orthodox Jew and taken only from such parts and in such manner as allowed by their religious laws and generally designated by the term—"kosher." If the presence of fat is desired in the finished product, such fat may be added, which, in order to conform with the Jewish ritual requirements, is preferably taken from a vegetable source. A valuable ingredient or material used for flavoring the extract may also be made from mushrooms, which are either heated in water alone or in mixture with other vegetables. The resultant liquor, after being freed from the insoluble parts, may be thickened into a pasty consistency and either in this form or in its undiluted form added to the extract.

The finished product will keep for a very long time, especially when sufficient salt has been added thereto, and may be put up in jars, etc., the same as beef extract is often sold, or may be freed from even more moisture or a sufficient amount of salt may be added, so that same can be pressed into suitable cakes (cube, or some other desired form). In order to increase its consistency gelatin and other substances of a similar nature may be added.

This product can be used in preparing sauces, bouillon and beef tea by simply diluting.

The method and quantities, ingredients, flavoring and seasoning may be variously changed and modified so as to suit individual tastes and desires without leaving the scope of the invention, as long as only the resultant compound will be a product which can be used in the preparation of beef tea, bouillon, gravies, sauces, etc., and which product contains neither ingredient nor is prepared after any method or process which is in any way or respect objectionable to or in violation of the strict dietary laws and rites as prescribed by the religion of the orthodox Jew. Thus also peptonized albumin from milk (casein) can be used.

I claim:—

1. An extract to be used in the preparation of bouillon, gravies, and sauces, consisting of peptonized albumin of vegetable origin, suitably seasoned, flavored and spiced, and containing fat.

2. A product to be used in place of beef extract preparations consisting of vegetable albumin, which has been rendered soluble, to which has been added a vegetable fat— suitably flavored and seasoned.

3. A compound of solid or semi-solid consistency containing peptonized vegetable albumin, vegetable fat, suitably seasoned and spiced.

4. Product to be used for making bouillon, beef tea, gravies, containing a mixture of peptonized vegetable albumin, and such product of animal origin as is of kosher nature, and which when dissolved in water will produce beef tea.

5. Process for preparing an extract to be used in making bouillon, beef tea, gravies and sauces, consisting in peptonizing and rendering soluble in water albumin and albumin containing parts of plants and vegetables, evaporating same down to a solid or semi-solid consistency and adding thereto a suitable seasoning and spicing, and fat.

6. Process for preparing a product to be used in making bouillon, beef tea, gravies and sauces, consisting in rendering soluble vegetable albumin, adding thereto suitable seasoning and spicing, and kosher product of animal origin and which when dissolved in water will produce bouillon, beef tea.

7. A compound containing peptonized vegetable albumin, and fat, to which is added so much salt that the finished product will have a solid consistency and can be pressed and cut into a permanent shape.

8. A compound containing peptonized vegetable albumin, an aqueous extract made from fresh or dried mushrooms and such other seasoning and spicing as is desired.

9. A compound containing peptonized vegetable albumin, an aqueous extract made from fresh or dried mushrooms, fat, and such other seasoning and spicing as is desired.

10. Peptonized vegetable albumin in combination with fat suitably seasoned and spiced and of such consistency that the product can be pressed and cut into a permanent shape to be used in making soups and gravies.

11. A compressed combination of peptonized vegetable albumin, fat, seasoning and spicing which, when dissolved in boiling water, forms a bouillon.

NATHAN SULZBERGER.

Witnesses:
JOHN S. COLWELL,
FRED E. MEYER.

Copies of this patent may be obtained for five cents each, by addressing the "Commissioner of Patents, Washington, D. C."